United States Patent [19]

McIlroy et al.

[11] Patent Number: 5,130,153
[45] Date of Patent: Jul. 14, 1992

[54] PROCESS FOR PAR-BOILING RICE

[75] Inventors: David McIlroy, Geel; Luc Jacops, Bouwel; Jef Kempen, Geel, all of Belgium; Adrian Trim, Houston, Tex.

[73] Assignee: Mars Inc., McLean, Va.

[21] Appl. No.: 469,525

[22] PCT Filed: Jul. 13, 1989

[86] PCT No.: PCT/GB89/00795
§ 371 Date: May 7, 1990
§ 102(e) Date: May 7, 1990

[87] PCT Pub. No.: WO90/00355
PCT Pub. Date: Jan. 25, 1990

[30] Foreign Application Priority Data

Jul. 14, 1988 [GB] United Kingdom ............... 8816778

[51] Int. Cl.$^5$ .................... A23L 1/00; A23B 9/00
[52] U.S. Cl. ...................... 426/242; 99/330; 99/516; 426/461; 426/462; 426/511
[58] Field of Search .............. 426/242, 461, 462, 510, 426/511; 99/467, 327, 330, 516

[56] References Cited

U.S. PATENT DOCUMENTS

| | | | |
|---|---|---|---|
| 2,498,573 | 2/1950 | Ozai-Durrani | 426/461 |
| 2,515,409 | 7/1950 | Jones et al. | 426/461 |
| 2,546,456 | 3/1951 | Landon et al. | 426/461 |
| 4,361,593 | 11/1982 | Brooks et al. | 426/461 |
| 4,810,511 | 3/1989 | Velupillai et al. | 426/242 |

Primary Examiner—George Yeung
Attorney, Agent, or Firm—Curtis, Morris & Safford

[57] ABSTRACT

According to the present invention, there is provided a process for par-boiling rice, comprising the steps of: (a) treating the rice with water at a temperature up to its boiling point to increase its water content to 17 to 28%; (b) steaming the soaked rice at a temperature from 100° to 125° C. to increase its water content to 19 to 30%; (c) heating the steamed rice, in a sealed vessel, under pressure and using dry heat, to a minimum temperature of approximately t° C., wherein t=195−2.5 M and M is the moisture content of the steamed rice in %, for from 1 to 5 minutes; (d) reducing the pressure on the rice over a period of 1 to 10 minutes to atmospheric pressure, thereby allowing water to evaporate from the heated rice to reduce its temperature to approximately 100° C. and its water content to 17 to 24%; and (e) drying the partially dried rice to microbiological stability. The product of the present invention has better consumer appeal than conventional par-boiled rice.

9 Claims, 2 Drawing Sheets

PANEL A

PANEL B

PROCESS FOR PAR-BOILING RICE

The present invention relates to a process for par-boiling rice and in particular, but not exclusively, to such a process using microwaves to heat the rice.

The process of par-boiling rice has been known for at least a hundred years and was originally carried out in order to facilitate the removal of the husk from paddy rice. (Paddy rice, or rough rice, is the term used in the art to describe rice as it is harvested which has only been treated coarsely to separate the majority of non-rice contaminants from the rice. Paddy rice comprises the rice kernel, its surrounding bran layer and an outer husk). It was found that this process also resulted in the dehusked rice becoming less attractive to rodent pests, more nutritious and less sticky after cooking.

It has since become common practice in rice growing areas to par-boil rice on an industrial scale to improve the properties of the rice. Generally speaking the par-boiling processes are carried out on paddy rice. In fact, as far as the Applicants are aware, all commercial par-boiling processes use paddy rice. However, some publications show small scale laboratory tests using very special, complicated and expensive methods to par-boil cargo rice (cargo rice is paddy rice from which the husk has been removed). Such methods have not been used commercially.

A typical industrial par-boiling process involves steeping the pad rice in water at about 70° C. for about 2.5 hours to raise the water content of the rice from 12% to about 35%. As long as the water temperature is kept below the gelatinisation temperature of the starch in the rice (about 70° C.) the rice will eventually reach an equilibrium value for its water content of about 35%, the time taken to reach this value being dependent on the water temperature. If the water content is raised above this figure it is likely that the rice will split open due to the effects of the absorption of the water. However, if the water content after steeping is significantly lower than this, the final product of the process will contain a large number of "white bellies" (which are grains in which the starch is not fully gelatinised).

In order to facilitate the steeping step, some industrial processes apply a vacuum to the rice after the addition of the water to remove air from the rice and then apply pressure, generally of about 2 bar, to the water to increase the rate of water penetration into the kernel.

Once the water content of the paddy rice has been raised to the desired level, the starch in the rice kernel is gelatinised, generally by steaming the steeped paddy rice at 100 to 120° C. A typical steaming step is carried out at 110° C. for 2 to 15 minutes. The product of the steaming step is paddy rice having a high water content and having the starch in its kernel gelatinised.

It is therefore necessary to dry the steamed rice. This needs to be done very carefully in order to avoid breaking the rice kernels. Originally it was carried out very slowly by leaving the rice out in the sun at ambient temperature for a few days. However, as this involves a long time delay, industrial processes generally use a drying schedule as follows. The steamed paddy rice is dried by use of hot air to a water content of about 22%. In this stage most of the water is removed from the outside of the grain and very little from the inside. This stage takes about 35 minutes.

The partially dried rice is then tempered by leaving it at ambient temperature for about four hours. During this time water equilibrates throughout the grain. Thereafter the tempered paddy rice is dried to a moisture content of 16 to 18% by use of hot air. This takes about half an hour. The rice is then finally dried by blowing air at room temperature over it for up to six hours to bring its water content to about 14%.

After the rice has been fully dried, it is dehusked in conventional manner to produce par-boiled brown or cargo rice (which comprises the rice kernel and the surrounding bran layer). Thereafter, the rice may be polished to remove the bran layer to produce par-boiled white rice.

Many variations in process conditions and apparatus are known, but they basically follow the same sequence of steeping, steaming and drying as described above.

Such an industrial process cannot be carried out on cargo rice since, at high moisture contents, such as 35%, cargo rice is soft and is severely damaged by bulk handling systems. During the steeping stage, the rice kernels crack and during the steaming stage the cracked kernels would fuse together to form a large agglomerated starchy mass. In the normal process, the effects of this cracking are overcome by the presence of the bran layer, which holds the rice grain together, and the husks, which protect the bran layer from damage. During steaming, the cracks are joined together by the gelatinisation of the starch. However, it is a disadvantage to have to process paddy rice as it is necessary to transport the husk to the par-boiling plant and to steep, steam and dry the husk, all of which adds to the cost of the process.

The above process also has a number of other disadvantages. The overall processing time is very long, generally being about fourteen hours even discounting the time required to move the rice from one stage to the next. The process requires a large heat input, to generate hot water for steeping, steam for gelatinization and hot air for drying. Generally, all this heat can be supplied by burning the husks, but this nonetheless requires equipment to carry out the burning and to heat the water, steam and air. The process also has a large water requirement for steeping and steaming. All these disadvantages are related to the necessity for introducing a large amount of water to the paddy rice to enable complete gelatinisation to take place. As it is necessary to introduce a large amount of water, it is also necessary to remove a large amount of water during the drying stages.

Nonetheless, the par-boiling process produces a product which has many advantages over normal white rice. During par-boiling, nutritionally valuable substances, such as vitamins and mineral salts, which are mainly found in the bran layer, migrate into the kernel, thus improving the, nutritional value of the product after milling away the bran layer. The product is dried to an optimum water content irrespective of the water content of the original paddy rice and is sterilized during the steaming and drying processes. The product is more robust than untreated rice and therefore greater yields during dehusking and polishing can be obtained. The product has a good appearance, will keep better in the raw or cooked state, will cook better to produce a less sticky product than would a normal white rice, and generally leaves less solids behind in the cooking water. The only slight disadvantage of the product is that it takes slightly longer to cook than normal white rice.

An excellent review of the state of the art of rice par-boiling is given in FAO Agricultural Development Paper No.97 entitled "Rice Parboiling" by F. Gariboldi, FAO Consultant, published by the Food and Agriculture Organisation of the United Nations, Rome, in 1974 (revised and republished in 1986). It can be seen from this Paper that the basic process of par-boiling rice has remained essentially unchanged for at least fifty years.

There have also been a large number of patents issued on the subject of par-boiling rice, among which may be mentioned U.S. Pat. No. 1 239 555 (Baumgartner, issued on 11 Sept. 1917), U.S. Pat. No. 2 287 737 (Huzenlaub), U.S. Pat. No. 2 546 456 (Landon) and U.S. Pat. No. 2 515 409 (Jones). These also show the antiquity of the par-boiling process.

It is an object of the present invention to provide a process which overcomes at least in part the disadvantages set out above, but which produces a product which is as good as or better that prior art par-boiled rice.

According to the present invention, there is provided a process for par-boiling rice, comprising the steps of:

(a) treating the rice with water at a temperature up to its boiling point to increase its water content to 17 to 28%;

(b) steaming the soaked rice at a temperature from 100 to 125° C. to increase its water content to 19 to 30%;

(c) heating the steamed rice, in a sealed vessel, under pressure and using dry heat, to a minimum temperature of approximately t° C., wherein $t = 195 - 2.5 M$ and M is the moisture content of the steamed rice in %, for from 1 to 5 minutes;

(d) reducing the pressure on the rice over a period of 1 to 10 minutes to atmospheric pressure, thereby allowing water to evaporate from the heated rice to reduce its temperature to approximately 100° C. and its water content to 7 to 24%; and (e) drying the partially dried rice to microbiological stability.

Optionally, in step (c) the rice is held at t° C. for a further 1 to 5 minutes.

It is to be noted that throughout this specification, all percentages are given by weight based on the wet weight of the rice.

Advantageously, after the pressure reduction step (d), the partially dried rice is tempered by being held at a water content of 17 to 24% for up to one hour, preferably from 15 to 30 minutes.

Preferably, in the treating step (a), the water is at a temperature of 50 to 95° C., and the treatment is carried out to increase the water content of the rice to between 20 and 24%.

The treatment step (a) may be carried out by soaking the rice in water in a bath or mixer, or by spraying water onto the rice in a mixer. In the above cases it is desirable to transfer the rice as quickly as possible to the steaming step so as substantially to avoid the formation of cracks in the grains.

If the rice is overwetted during this stage the grains are likely to be too soft and stick together during handling. Moreover the wetted rice will be difficult to transport as it will clump together. If the rice is not sufficiently wetted, the rice may not contain enough water for full gelatinization to occur during the heating step, thus leading to the appearance of "white bellies" in the final product.

Preferably, during the steaming step (b), the water content of the rice is increased to 22 to 30%, advantageously from 24 to 28%, by use of steam at 100 to 115° C., i.e. at atmospheric or slightly superatmospheric pressure. This will generally take between 20 and minutes.

The steaming may be carried out using a belt steamer, a screw steamer, a screw steamer operated under mixing conditions, or a vertical pipe steamer.

Preferably, the steam is cleaned, either by filtration or by being generated in a closed circuit heat exchanger, before it is applied to the wetted rice. Advantageously the mixing conditions under which the steamer is operated are as gentle as possible to reduce the number of broken grains formed during the process.

During the steaming process not only is the water content of the rice increased, but also the distribution of the water in the rice is made substantially even and the temperature of the rice material is brought to the steam temperature, thus reducing the amount of heating which needs to be achieved in the next stage.

If the wetted rice is steamed at too low a temperature or for too short a time, the rice may be too dry to be properly processed in the heating stage and the product may contain too large a proportion of white bellies. If the rice is steamed at too high a temperature or for too long, there will be produced a product having a dark colour.

In some instances, it is possible to combine the wetting step (a) with the steaming step (b). For instance, the rice in a steamer may have water sprayed onto it at the same time that the steam is being applied.

The water spray will raise the water content to 17 to 20% and the steam will add the remaining amount of water and heat the rice.

The dry heating step (c) is carried out to increase the temperature of the rice and the water without substantially adding water to or removing water from the rice.

Preferably, the drying heating step is carried out by applying microwave radiation or dielectric heating to the steamed rice in a sealed vessel under pressure to raise the temperature in the vessel to the desired temperature.

The minimum overpressure needed in the vessel is a function of the temperature, for instance the over-pressure necessary at 135° C. is about 2.2 bar and at 140° C. is about 2.6 bar. Further pressure in the vessel can be generated, for instance, by the addition of compressed air. It is preferred that the pressure in the vessel is somewhat above the minimum necessary over pressure. Typically at 135° C. the pressure will be in the range 2.2 to 4 bar and at 140° C. the pressure will be in the range 2.6 to 6 bar. Higher pressures can be used, but these do not provide any advantage and add to the cost of the process.

For the preferred moisture content of 24% after steaming, the temperature should be raised to approximately 135° C. This generally should take about 2.5 minutes. During this time steam at pressure is generated by vapourisation of a small proportion of the water in the rice. Also during this time, the starch in the rice grain is gelatinised and any cracks in the grain are sealed.

The temperature of heat treatment is related to the moisture content in order to ensure that the starch in the rice grain is fully gelatinised. A low moisture content steamed rice will need a high gelatinization temperature. However, with such high temperatures there is a possibility that the rice will become highly coloured due to caramelisation of the starch.

Also the rice grain on heat treatment may bend into a banana shape due to the differential effects of the heat on the caryopsis and germ in the kernel. With a higher water content, lower temperatures can be used, but such high water content rice is more difficult to handle. Therefore the water content is preferably between 24 and 28% after steaming.

The temperature of the heat treatment may generally vary by about ± 5° C. from the value given by the equation set out above. However, if the temperature is too much lower than the calculated temperature the rice may be incompletely gelatinized, thus producing an unacceptable number of white bellies, and the product on cooking may become unacceptably sticky. Preferably, therefore, the temperature used in step (c) is within about ±2° C. of the value given by the equation set out above.

If the temperature is too much higher than the calculated temperature the rice may become coloured and adverse taste components may be introduced. If the temperature is not raised quickly enough the rice may become coloured since it will be held at an elevated temperature too long. If the temperature rise is too fast there may be uneven heating, resulting in the production of white bellies (under processed) and coloured (over processed) grains.

Preferably, the rice is mixed well during the heat treatment so as to obviate uneven treatment of the rice.

Preferably, the rice is held at temperature for about 2 minutes, although this time may be raised in order to compensate for any variations in the temperature of the treatment.

The use of microwaves as the source of dry heat is preferred as it enables the rice to be heated rapidly to temperature in a controlled manner. The microwaves may be applied by any method known to person skilled in the art. Such methods are described, for instance, in "Industrial Microwave Heating" by Metaxas, A.C. and Meredith, R.J., published in 1983 (ISBN 0-906048-89-3).

Dielectric heating can be used as an alternative to the preferred microwave heating as it has many of the advantages of quick heating and convenience of microwave heating.

However, the dry heating may also be achieved by use of hot air, hot sand or steam heating, for instance in a fluidised bed, or by infrared heating. These methods are also well known to those skilled in the art but are less preferred as they are less convenient and generally do not produce as good a product as is possible using microwave or dielectric heating.

At the end of the heating step (c), the vessel contains wet rice at the desired temperature at superatmospheric pressure. Therefore, as the pressure on the rice is reduced in step (d), water will evaporate from the rice grains and the temperature of the grains will fall from the desired temperature to about 100° C. This will cause a reduction in the water content of the rice to 17 to 24%.

The pressure may be reduced continuously or stepwise, and preferably the pressure reduction is carried out over a period of 1 to 5 minutes.

If the pressure reduction is carried out too quickly, for instance by explosive depressurization, the rice may crack or explode. However if the reduction is carried out too slowly, the rice may become coloured as it will have been kept at a high temperature for too long.

This step of the process is particularly advantageous as it results in a significant drying of the rice without the need for any further heat input.

In the optional tempering step, the rice is advantageously kept at a moisture content of at least 18%, for instance by storing it in a closed insulated system. The tempering step, if used, decreases the rate of drying and may therefore prevent cracking of the grains taking place during further drying.

In the final drying step (e), the partially dried and optionally tempered rice is dried to reduce its water content to approximately 13%. At about this water level the rice is microbiologically stable and can be stored in unsealed packets for significant lengths of time. The exact water content for microbiological stability will vary with the type of rice but can be readily determined by a person skilled in the art.

The final drying step (e) can be carried out by use of normal ventilation or using a forced air draft at room temperature. This will generally take about 6 to 8 hours, but is advantageous in that it requires minimal heat input and in that the slow drying will assist in preventing the formation of cracks in the grain.

After the final drying step, the rice may be processed in conventional manner, for instance by dehusking and/or polishing.

The process of the present invention is very advantageous when compared to prior art par-boiling processes. The heat and water requirements of the process are significantly less than those of the prior-art processes. In particular, the drying is carried out without the need for any extensive additional heat input. The additional energy input to the present process is considerably less than for any known par-boiling process. Also, the capital costs of the plant used for the process are relatively low as there is less need for blowers, water heaters, steam generators or soaking tanks. Moreover, it has been found that the process of the present invention can be carried out not only on paddy rice but also on cargo (dehusked) rice. It is believed that this is possible because of the careful control exercised over the wetting, steaming and drying conditions, which substantially eliminates the tendency of the grains to crack and be damaged by handling. There is therefore no need for the husk to maintain their structural integrity.

Being able to process cargo rice has additional advantages. It is possible to separate mature rice grains of good quality from immature grains (thins) and broken grains before processing. Moreover, damaged grains which discolor during normal par-boiling processes to form 'peck' (blackened grains) are weaker than normal. A large proportion of these break during de-husking and thus can be removed with the broken grains before processing. Thus in the present process it is possible, but not necessary, to feed the process with only the good quality, de-husked grains, whereas in the prior art processes it is necessary to treat good and bad and broken and unbroken grains as well as the husks. Clearly, for the present process the weight of rice which needs to be processed to obtain a desired weight of product is significantly less than that needed for the conventional processes. Of course, if desired, lower quality rice such as paddy rice or untreated cargo rice can be processed.

The product produced by the present process is superior to prior-art par-boiled rice. It differs slightly in cooking time, but appears to be more resistant to overcooking, is less sticky when cooked, and has higher hardness and less stickiness in organoleptic properties than prior art par-boiled rice. Rice made by this process also shows a slight degree of elongation during cooking and gives a longer, more slender grain than prior art par-boiled rice.

The present invention also includes apparatus for carrying out the process of the present invention and par-boiled rice produced thereby.

According to a second aspect of the present invention, there is provided par-boiled rice which, when cooked for about 18 minutes in boiling water, is less sticky, thinner and longer grained and less coloured than conventional par-boiled rice cooked under the same conditions.

Preferably, the par-boiled rice of the present invention is obtainable by the process of the present invention.

The present Applicants have carried out sensory analysis of cooked, par-boiled rices using trained panels of tasters. This sensory analysis enables a quantitative indication of the appearance and texture (mouthfeel) of the rice to be given. In the "appearance" tests, the panel looked for the stickiness, milling, grain thickness, grain length, colour, dryness and mushiness in the appearance of the cooked rice. In the "texture" tests, the panel tests for granularity, sponginess, rubberiness, hardness of bite, softness of bit, dryness, wateriness, stickiness and smoothness.

In the "appearance" tests, the par-boiled rice of the present invention is noticeably less sticky, thinner grained, longer grained and less coloured than conventional par-boiled rice. In the "texture" tests, the rice of the present invention is significantly less sticky and smoother grained. These qualities make it more acceptable to the consumer than conventional par-boiled rice.

The present invention also provides apparatus for producing bar-boiled rice comprising:

(a) means for treating the rice with water at a temperature up to its boiling point to increase its water content to 17 to 28%;

(b) means for steaming the soaked rice at a temperature from 100 to 125° C. to increase its water content to 19 to 30%;

(c) means for heating the steamed rice, in a sealed vessel, under pressure and using dry heat, to a minimum temperature of approximately t° C., wherein $t = 195 - 2.5 M$ and M is the moisture content of the steamed rice in %, for from 1 to 5 minutes;

(d) means for reducing the pressure on the rice over a period of 1 to 10 minutes to atmospheric pressure, thereby allowing water to evaporate from the heated rice to reduce its temperature to approximately 100° C. and its water content to 17 to 24%; and (e) means for drying the partially dried rice to microbiological stability.

One embodiment of the present invention is now described, by way of example only, with reference to the accompanying drawings in which.

Figure 1:
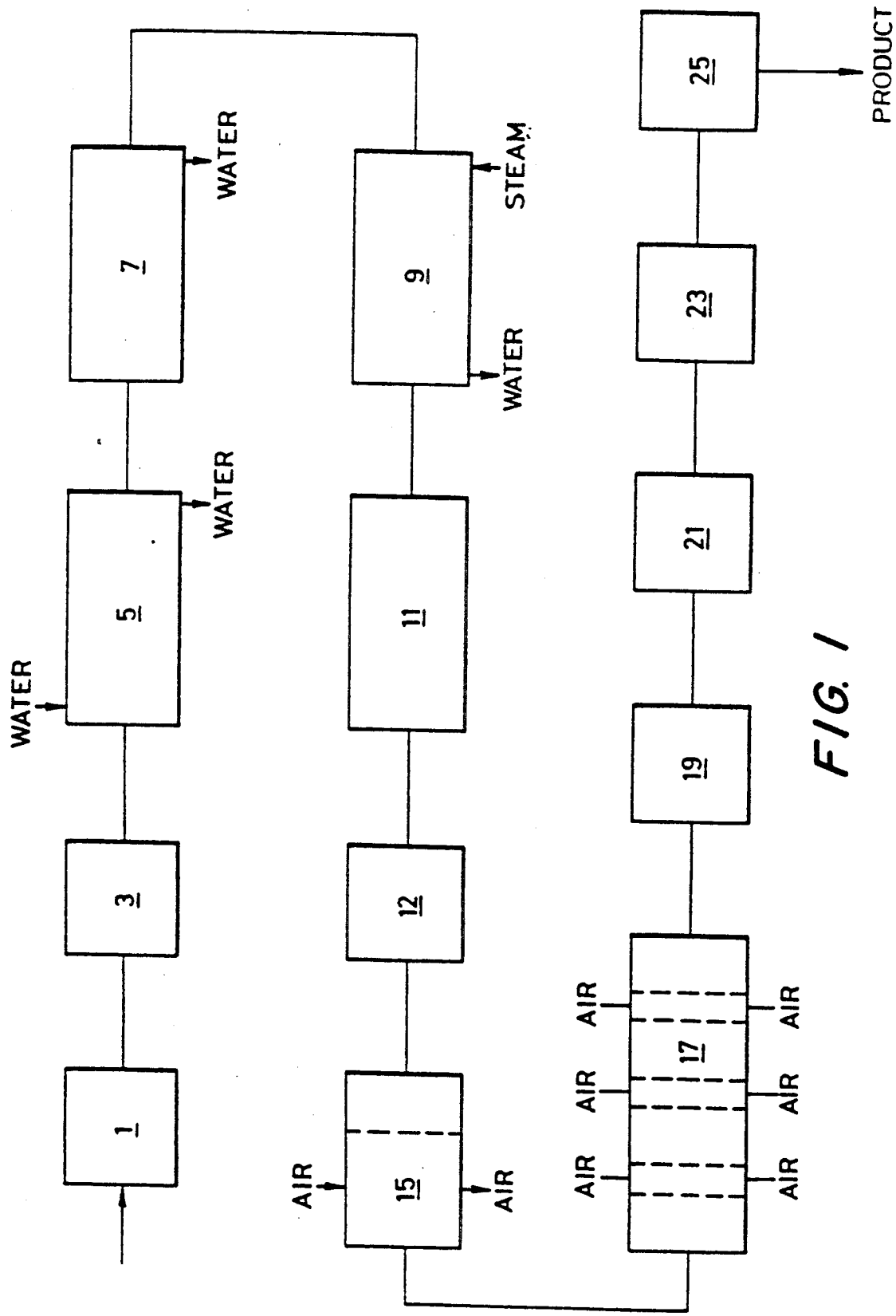
FIG. 1 shows schematically a plant for par-boiling rice.

Referring to the drawing, there is shown a silo 1 in which is stored a quantity of cargo rice (i.e. the rice kernel and its surrounding bran layer, the husk having been removed). The cargo rice had been passed through a sorter (not shown) wherein thins and broken grains were separated from the good quality whole grains. The sorter may be, for instance, a Labofix grain sorter supplied by Emceka and Gompper, of Cologne, West Germany.

The whole grains, which have a water content of 12%, are fed from the silo 1 through a feeder 3 into a screw driven hot steeper 5 containing water at 71° C. The residence time of the rice in the water is 4.5 minutes. During transit through the steeper 5, the water content of the rice is raised to 21.9%.

The rice is then transported onto a dewatering belt 7 to remove surface water from the rice. The residence time of the rice on the belt 7 is between 1 and 3 minutes. The rice is fed from the belt 7 directly into a steamer 9 wherein steam at 110° C. and slightly above atmospheric pressure (about 0.46 bar overpressure) is applied to the rice. The residence time of the rice in the steamer is 30 minutes. During its transit through the steamer 9, the water content of the rice is raised to about 28% and its temperature is raised to 110° C.

The steamed rice is then fed into a continuous microwave heating unit 11 operating at 132 to 135° C. and an overpressure of about 4 bar. The residence time of the rice in the microwave unit 11 is 4 minutes. During its residence time in the microwave unit 11, the starch in the rice grains is fully gelatinised.

The rice is then passed to a pressure reduction system 12 wherein the pressure on the rice is released continuously over a period of from 3 to 6 minutes. During this time, the temperature of the rice drops to about 100° C., its water content is reduced to about 22% and the pressure falls to atmospheric.

The rice emerging from the pressure reduction system is passed to a pre-dryer 15 wherein it remains in a tempering zone for a residence time of 1 h. It then passes through a pre-drying zone with a residence time of 0.5 h. The pre-drying zone has air at ambient temperature passing therethrough. The rice emerges from the pre-dryer 15 at a temperature of 27° C. and a moisture content of 20.4%.

The pre-dried rice is then transported to and passed through a conventional grain dryer 17 comprising a series of alternating tempering and drying zones followed by a final cooling zone. Air is passed through the drying zones. The residence time of the rice in the dryer is 8 h and the rice emerges with a moisture content of 13%, at which content it is microbiologically stable.

The dried rice is then milled in a milling machine 19 (a Laboratory Stonemill supplied by Streckel and Schrader, Hamburg, West Germany), to remove its bran layer. The milled rice is then passed to a polisher 21. The polished rice is passed through a second sorter 23, of the type described above, which separates broken grains, and a third sorter 25, a type GB 104C. sorter supplied by ESM Inc., of Houston, U.S.A., which separates coloured grains from whole fully par-boiled grains. The sorted rice represents the final product.

Figure 2A:
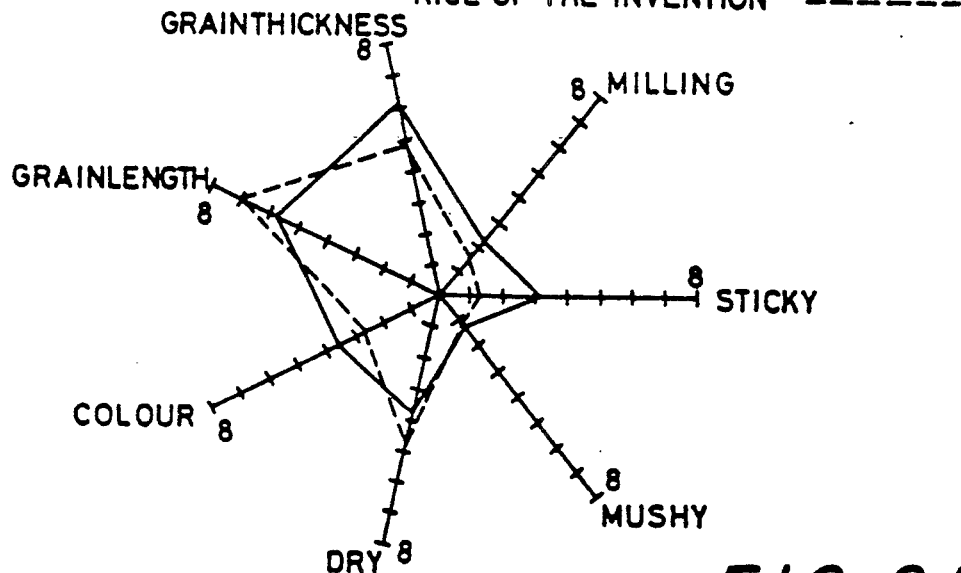
FIGS. 2A and 2B show a sensory analysis of par-boiled rice according to the invention.
Figure 2B:
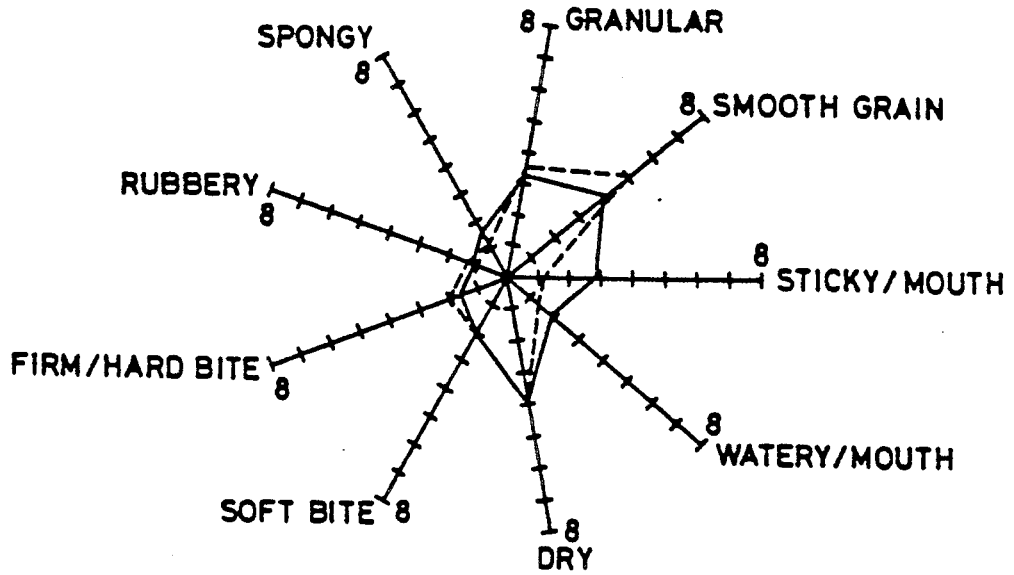

The par-boiled rice produced by the process described above was cooked in boiling water for 18 minutes and compared with the prior-art par-boiled rice, cooked in the same way, by sensory analysis in taste-panel testing. On taste-panel testing the present product when cooked was found to be somewhat less sticky and somewhat harder than cooked prior-art par-boiled rice but otherwise had similar organoleptic properties. This can be seen by reference to FIG. 2 which shows in Panel A an "appearance" analysis and in Panel B a "texture" analysis. Attention is particularly drawn to the stickiness and colour value in Panel A and the sticky/mouth and smooth grain values in Panel B. The bar-boiled rice of the present invention was also generally regarded by consumer home use panels as being superior to the prior art product.

It can thus be seen that the present invention provides an advantageous process which produces a product superior to known products in a more efficient manner.

It will be appreciated that the present invention has been described above by way of illustration only and that various modifications of detail may be made without departing from the scope of the invention as defined in the appended claims.

We claim:

1. A process for par-boiling rice, comprising the steps of:
   (a) treating the rice with water at a temperature up to its boiling point to increase its water content to 17 to 28%;
   (b) steaming the soaked rice at a temperature from 100 to 125° to increase its water content to 19 to 30%;
   (c) heating the steamed rice, in a sealed vessel, under pressure and using dry heat, to a minimum temperature of approximately t° C., wherein t=195–2.5 M and M is the moisture content of the steamed rice in %, for from 1 to 5 minutes;
   (d) reducing he pressure on the rice over a period of 1 to 10 minutes to atmospheric pressure, thereby allowing water to evaporate from the heated rice to reduce its temperature to approximately 100° C. and its water content to 17 to 24%; and
   (e) drying the rice produced in step (d) to microbiological stability.

2. The process of claim 1, wherein in step (c) the rice is held at t° C. for a further 1 to 5 minutes.

3. The process of claim 1, wherein after step (d) and before step (e), the rice is tempered by being held at a water content of 17 to 24% for up to one hour.

4. The process of claim 1, wherein in step (a) the water is at a temperature of 50 to 95° C. and the treatment is carried out to increase the water content of the rice to between 20 and 24%.

5. The process of claim 1, wherein during the steaming step (b), the water content of the rice is increased to 22 to 30%.

6. The process of claim 1, wherein steps (a) and (b) are combined.

7. The process of claim 1, wherein the dry heating step (c) is carried out by applying microwave energy to the steamed rice in a sealed vessel under pressure.

8. The process of claim 1, wherein the dry heating step (c) is carried out by dielectric heating of the steamed rice in a sealed vessel under pressure.

9. Apparatus for producing par-boiled rice comprising
   (a) means for treating the rice with water at a temperature up to its boiling point to increase its water content to 17 to 28%.
   (b) means for steaming the soaked rice at a temperature from 100 to 125° C. to increase its water content to 19 to 30%;
   (c) means for heating the steamed rice, in a sealed vessel, under pressure and using dry heat, to a minimum temperature of approximately t° C., wherein t=195–2.5 M and M is the moisture content of the steamed rice in %, for from 1 to 5 minutes;
   (d) means for reducing the pressure on the rice over a period of 1 to 10 minutes to atmospheric pressure, thereby allowing water to evaporate from the heated rice to reduce its temperature to approximately 100° C. and its water content to 17 to 24%; and
   (e) means for drying the rice produced by means (d) to microbiological stability.

* * * * *